United States Patent
Onodi

(10) Patent No.: US 8,895,853 B2
(45) Date of Patent: Nov. 25, 2014

(54) CABLE TRAY, INSTALLATION KIT, AND ELECTRICAL INSTALLATION

(75) Inventor: Tamas Onodi, Thalwil (CH)

(73) Assignee: Woertz AG, Muttenz (CH)

(*) Notice: Subject to any disclaimer, the term of this patent is extended or adjusted under 35 U.S.C. 154(b) by 115 days.

(21) Appl. No.: 13/604,868

(22) Filed: Sep. 6, 2012

(65) Prior Publication Data

US 2013/0240263 A1 Sep. 19, 2013

(30) Foreign Application Priority Data

Sep. 7, 2011 (EP) .................................. 11007284

(51) Int. Cl.
| | | |
|---|---|---|
| H02G 3/04 | (2006.01) | |
| F16L 3/00 | (2006.01) | |
| H01B 7/295 | (2006.01) | |
| A62C 3/16 | (2006.01) | |

(52) U.S. Cl.
CPC ................ *F16L 3/00* (2013.01); *H02G 3/0437* (2013.01); *H01B 7/295* (2013.01); *A62C 3/16* (2013.01); *H02G 3/0412* (2013.01)
USPC .......................... 174/68.3; 174/68.1; 174/70 R

(58) Field of Classification Search
CPC ......... H02G 3/0412; H02J 4/00; H01B 7/295; H01B 7/00; F16L 3/00
USPC ....... 174/68.1, 70 R, 72 A, 95, 120 A, 121 R, 174/121 A, 68.3; 442/136, 180; 428/920, 428/921
See application file for complete search history.

(56) References Cited

U.S. PATENT DOCUMENTS

| | | | | |
|---|---|---|---|---|
| 4,064,359 A | * | 12/1977 | Peterson et al. | ............... 174/107 |
| 4,433,732 A | * | 2/1984 | Licht et al. | ...................... 169/48 |
| 4,584,214 A | * | 4/1986 | Eiermann | .................... 428/34.5 |
| 4,585,070 A | * | 4/1986 | Garrido | ........................... 169/48 |
| 4,690,860 A | * | 9/1987 | Radvan et al. | ................ 442/136 |

(Continued)

FOREIGN PATENT DOCUMENTS

| | | |
|---|---|---|
| DE | 20 2006 012 624 | 2/2007 |
| EP | 0 665 608 | 8/1995 |
| EP | 0 844 713 | 5/1998 |
| EP | 1 429 436 | 6/2004 |

OTHER PUBLICATIONS

Abstract and English Machine Translation of German Application No. DE 20 2006 012 624, Feb. 8, 2007.

(Continued)

*Primary Examiner* — Lisa Lea Edmonds
*Assistant Examiner* — Keith Depew
(74) *Attorney, Agent, or Firm* — Frost Brown Todd LLC

(57) ABSTRACT

A cable tray preserving cable support functionality under fire impact, including a bed for laying and supporting at least one cable. The bed is made from fire resistant textile woven material which is embedded in resin. The textile woven material is provided on both sides with respect to the longitudinal direction of the cable tray with a fire resistant attachment device. The attachment devices are coupled to the textile woven material, wherein, with burned-off resin, the attachment devices remain coupled to the textile woven material to take up tension force from the textile woven material when the textile woven material extends like a hammock between the attachment devices to still support the at least one cable. An installation kit for an electrical installation, and an electrical installation with cable trays of this sort are also described.

21 Claims, 2 Drawing Sheets

(56) References Cited

U.S. PATENT DOCUMENTS

| | | | |
|---|---|---|---|
| 4,994,317 A * | 2/1991 | Dugan et al. | 442/72 |
| 5,165,453 A * | 11/1992 | Walker, Jr. | 138/104 |
| 5,811,731 A * | 9/1998 | Jacques et al. | 174/68.3 |
| 5,964,434 A * | 10/1999 | Lynch, Jr. | 248/60 |
| 6,027,367 A | 2/2000 | Woertz et al. | |
| 6,398,190 B1 * | 6/2002 | Li | 254/134.4 |
| 6,835,676 B2 * | 12/2004 | Kim et al. | 442/70 |
| 6,876,797 B2 * | 4/2005 | Morris | 385/100 |
| 6,959,898 B1 * | 11/2005 | Laughlin et al. | 248/60 |
| 7,085,458 B2 * | 8/2006 | Morris | 385/110 |
| 7,560,644 B2 * | 7/2009 | Ford et al. | 174/68.1 |
| 2009/0126989 A1 | 5/2009 | Ford et al. | |
| 2009/0133897 A1 * | 5/2009 | Jorand et al. | 174/113 R |

OTHER PUBLICATIONS

Abstract and English Machine Translation of German Application No. EP 0 665 608, Aug. 2, 1995.

Abstract and English Machine Translation of French Application No. EP 0 844 713, May 27, 1998.

Abstract and English Machine Translation of German Application No. EP 1 429 436, Jun. 16, 2004.

* cited by examiner

CABLE TRAY, INSTALLATION KIT, AND ELECTRICAL INSTALLATION

FIELD OF THE INVENTION

The invention relates to a cable tray, an installation kit, and an electrical installation.

SUMMARY OF THE INVENTION

One aspect relates to a cable tray preserving cable support functionality under fire impact. The cable tray comprises a bed for laying and supporting at least one cable, which bed extends over a length of the cable tray. The bed is made from fire resistant textile woven material which is embedded in resin. The textile woven material is provided on both sides with respect to the longitudinal direction of the cable tray with a fire resistant attachment device. The attachment devices are coupled to the textile woven material, wherein, with burned-off resin, the attachment devices remain coupled to the textile woven material to take up tension force from the textile woven material when the textile woven material extends like a hammock between the attachment devices to still support the at least one cable.

Another aspect relates to an installation kit for an electrical installation. The installation kit comprises at least one cable tray for preserving cable support functionality under fire impact, at least one fire safety cable with circuit integrity under fire impact; and at least two tray supports for mounting the at least one cable tray. The cable tray comprises a bed for laying and supporting at least one cable, which bed extends over a length of the cable tray. The bed is made from fire resistant textile woven material which is embedded in resin and the textile woven material is provided on both sides with respect to the longitudinal direction of the cable tray with a fire resistant attachment device. The attachment devices are coupled to the textile woven material, wherein, with burned-off resin, the attachment devices remain coupled to the textile woven material to take up tension force from the textile woven material when the textile woven material extends like a hammock between the attachment devices to still support the at least one cable. The tray supports are configured for attachment at the attachment devices.

Another aspect relates to an electrical installation with circuit integrity under fire impact, comprising at least one cable tray preserving cable support functionality under fire impact, at least one cable in the cable tray; and at least two tray supports. The at least one cable tray comprises a bed for laying the at least one cable, which bed extends over a length of the cable tray. The bed is made from fire resistant textile woven material which is embedded in resin. The textile woven material is provided on both sides with respect to the longitudinal direction of the cable tray with a fire resistant attachment device. The attachment devices are coupled to the textile woven material, wherein, with burned-off resin, the attachment devices remain coupled to the textile woven material to take up tension force from the textile woven material when the textile woven material extends like a hammock between the attachment devices to still support the at least one cable. The at least one cable tray is attached with the attachment devices at tray supports.

BRIEF DESCRIPTION OF THE DRAWINGS

The appended drawing illustrates examples schematically and not to scale, wherein.

The drawings and the description of the drawings are of examples of the invention and not of the invention itself.

DETAILED DESCRIPTION OF EXAMPLES

Figure 1:
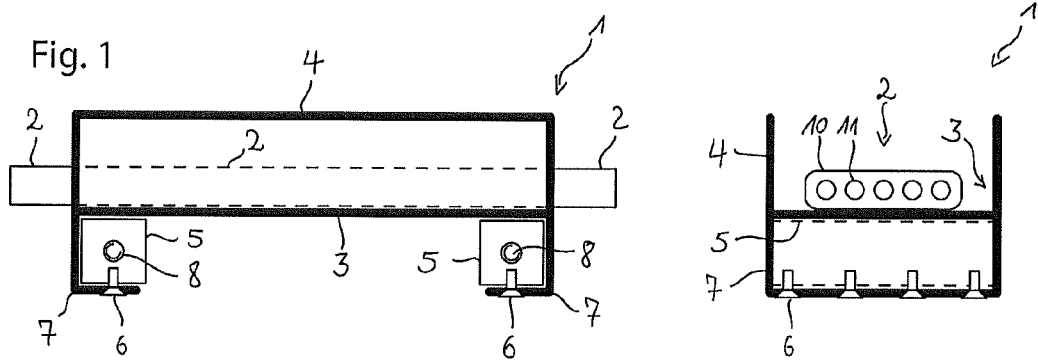
FIG. 1 respectively illustrates a lateral view in longitudinal and transversal direction of the cable tray with a cable laid flat in normal operations.

A cable tray 1 illustrated in FIG. 1 (illustrated on the left side viewed in transversal direction and illustrated on the right side viewed in longitudinal direction) is used for laying cables and/or cable bundles. The cables may be fire safety cables, e.g. in the form of a flat cable 2. Thus, the cable tray 1 alone, but also the system together with the cable 2 (for example, a flat cable) and the tray supports 9, 9a, 9b, is configured for circuit integrity in case of fire as will be subsequently illustrated.

The cable tray 1 is, for example, about 2 m long and about 20 cm wide, wherein the bed 3 has a U-shaped cross-sectional profile which forms a channel with approximately 10 cm tall side walls 4 (U-arms of the cross-sectional profile) for inserting the flat cable 2. The bed 3 is made from textile woven material which is embedded in resin. As recited supra, FIGS. 1 through 7 are not drawn to scale. They also illustrate merely schematic symbolized depictions in which, for example only some covered parts are illustrated.

The cable tray 1 respectively includes a transversal beam 5 (with reference to the longitudinal direction) configured as an attachment device at its ends, namely a square rod made from steel with a length of 20 cm. The transversal beam 5 is connected to the board 2 through bolts 6 transversal to the longitudinal direction and extends over the width of the bed 3. Accordingly, the textile woven material is provided on both sides with a protrusion 7 (which has the form of an ear when looking at the unwound textile woven material) so that the bed 3 extends in downward direction beyond the channel, so that it encloses the transversal beam 5 overall with, in this example, approximately ¾ of its circumference.

Figure 6:
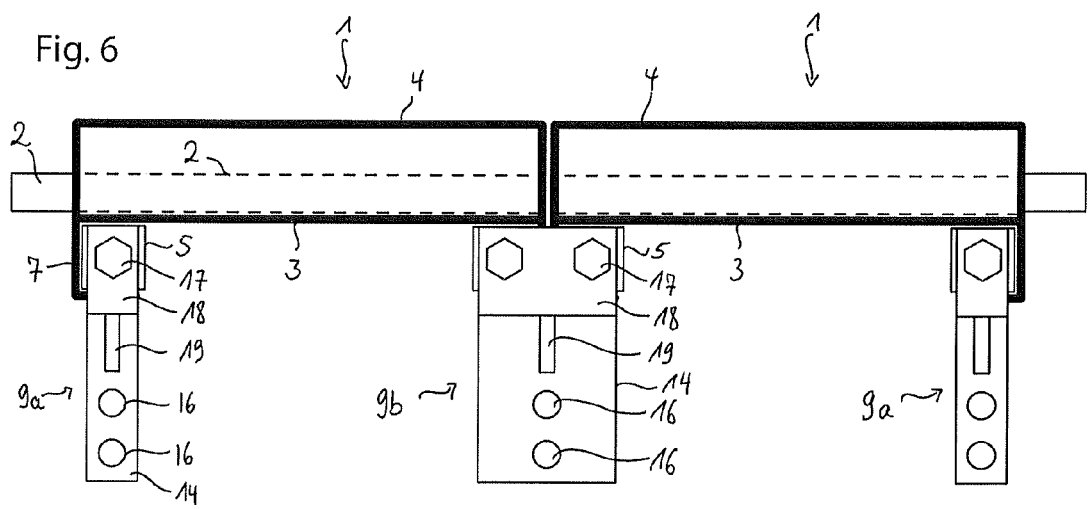
FIGS. 6 and 7 illustrate an electrical installation of an installation kit with the cable tray according to FIG. 1.
Figure 7:
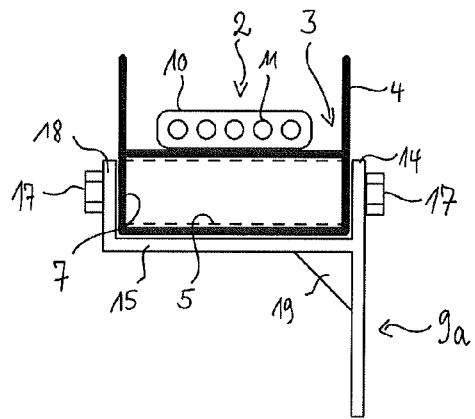

The transversal beam 5 is used on the one hand side as an attachment device to mount the cable tray 1 as described infra with respect to FIGS. 6 and 7. On the other hand side, the transversal beam 5 is also used to support the bed 3, essentially the textile woven material like a hammock for supporting the flat cable 2 as soon as the resin burns off under fire impact. During normal operations when the resin has not yet burned off, the bed 3 is self-supporting based on its U-shaped cross-sectional profile since the textile woven material is stiffened by the resin. Thus, the bed 3 is supported on the transversal beams 5 and the hammock effect only plays an insignificant role in normal operations.

Though the bed is supported in normal operations in longitudinal direction through form locking of the protrusions 7 with the transversal beams 5, however, for attachment purposes, additionally the textile woven material is bolted together with the transversal beams 5 through screws 6 with countersunk heads. This on the one hand side prevents a lateral sliding in transversal direction of the bed 3 from the transversal beams 5. On the other hand side, the screws are essentially also provided for the fire impact, since the bed 3, after the resin burns off, also loses its self-supporting shape in the portion of its extension of its protrusions 7 after the resin has burned off and the textile woven material would slide off from the transversal beams 5 in longitudinal direction.

Thus, the textile woven material is respectively provided with holes for running the bolts 6 through, wherein the edges of the holes are reinforced against tearing similar to a buttonhole in textile clothing.

Furthermore, the transversal beams 5 have threaded holes 8 on their respective faces, wherein the threaded holes are provided for attaching the cable tray 1 at tray supports 9a, 9b (c.f. FIGS. 6 and 7).

The bed 3 is made from a glass fiber woven material which is embedded in a polyester resin. The glass fiber woven material is fire resistant up to a temperature of at least 1300° C., so that the bed 3 is suitable for supporting the contacting flat cable 2 up to at least 1300° C. However, the polyester resin burns off at much lower temperatures.

Figure 2:
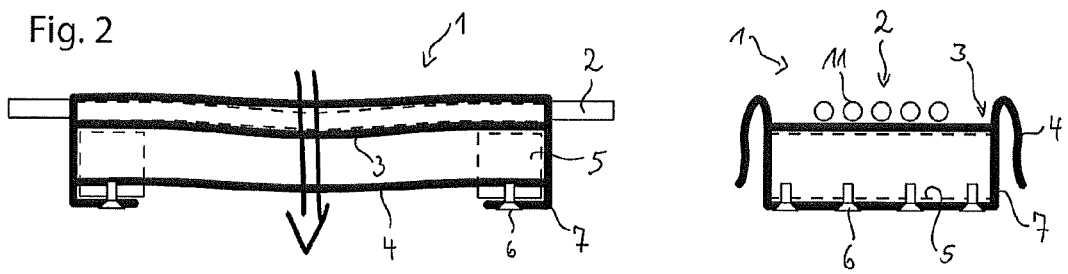
FIG. 2 illustrates the cable tray according to FIG. 1 under fire impact.

Fire impact, more precisely the cable tray 1 under fire impact, is illustrated in FIG. 2, wherein the situation illustrated herein also corresponds to the situations after the fire impact. Under fire impact, the resin burns off so that the bed 3 is not built up from the composite material made from textile woven material and resin anymore, but is essentially only made from the textile woven material. Therefore, the stiffness of the bed 3 is lost under fire impact and the bed becomes flexible according to the properties of the mere textile woven material.

This has the effect that the self-supporting properties of the bed 3 are omitted under fire impact so that a hammock effect then becomes relevant. Accordingly, the bed 3 slightly hangs through under fire impact along its longitudinal direction as indicated by the arrow in FIG. 2, wherein the degree of hanging through is essentially defined by the elasticity of the textile woven material through the weight of the contacting flat cable and the length of the cable tray 1. For small hang through, therefore, the fabric structure is selected so that the textile woven material is practically non-elastic, thus expands only slightly under tension.

Accordingly, also the supported flat cable 2 only goes through insignificant bending when the bed 3 transitions into its hang through condition under fire impact. Due to the hang through only being small and bending resulting therefrom, mechanical tensions within the flat cable 2, however, remain small. This prevents a distortion of the stand conductors 11 and thus also a short circuit. Under fire impact, the cable support functionality is thus preserved. This assures circuit integrity of the flat cable 2 and of the entire system under fire impact.

As illustrated in FIG. 2 (viewed in longitudinal direction), also the side walls 4 lose their load bearing capability and therefore hang in downward direction. In spite of that, the bed 2 keeps sufficient load bearing capability for supporting the flat cable 2 since it is kept under mechanical tension through the transversal beam in longitudinal direction (hammock effect). Furthermore, the bed 3 is supported in transversal direction by the transversal beams 5 and the screws 6 arranged along the bed so that it does not fold (for example due to the contacting flat cable 2) along the longitudinal direction in the portion of the contact surface of the flat cable 2, but so that the bed continues to form an essentially flat support for the flat cable 2. Thus, a laterally acting force is prevented which moves the strand conductors 11 towards one another.

In some additional examples, plural support rods are embedded in the resin, wherein the support rods are arranged below the textile woven material and/or braided together with the textile woven material. In some examples, the support rods extend in longitudinal direction, in other examples they extend in transversal direction. Thus, the support rods prevent the textile woven material, thus the bed from hanging through in the respective direction, in particular under fire impact when the resin has burned off.

Under fire impact, also the insulation 10 of the flat cable 2 burns off besides the resin. Since the flat cable 2 is a fire safety cable, in this fire safety cable, one or plural precautions are taken against the strand conductors 11 of the flat cable 2 contacting and thus shorting one another. Thus bars made from fire resistant material are included in the insulation 10, e.g. between the strand conductors 11, wherein the bars prevent a lateral movement of the strand conductors 11 towards one another.

Irrespective of these protective options, the textile woven material is electrically insulating (e.g. glass fiber material), so that the bed 3 therefore forms an additional insulation of the flat cable 2. This insulation protects for example the strand conductors 11 against contacting the metallic and therefore electrically conductive transversal beams 5. This could also generate a short between the strand conductors 11 themselves or also between a strand conductor 11 and a grounding of the transversal beam 5. Also this way, the textile woven material contributes to the circuit integrity of the system.

Figure 3:
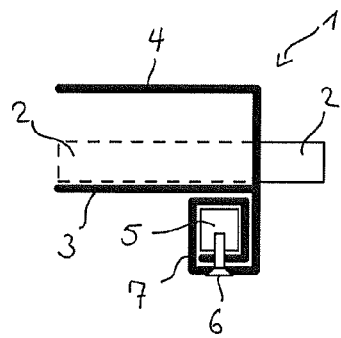
FIGS. 3 through 5 illustrate different variants of the attachment device.
Figure 4:
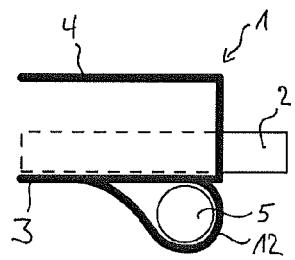
Figure 5:
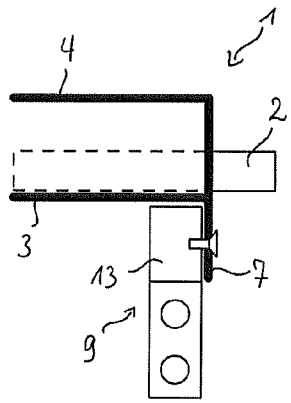

Before the installation of the installation cable set with cable trays 1, tray supports 9, 9a, 9b and flat cable 2 is described, further examples are illustrated in FIGS. 3 through 5. These variants differ essentially with respect to their attachment device from the cable tray 1 described supra.

In a first variant, the textile material that is embedded in the resin according to FIG. 3 is wound around the transversal beams 5 with the protrusions 7 and thus with approximately 1.5 windings. Other examples on the other hand side illustrate approximately 2, 3, 5, or more envelopments. Overall, the friction between textile woven material and transversal beam 5 can be increased and thus the tension in the textile woven material in the portion of the screws can be reduced in order to e.g. prevent a tearing of the textile material. With increasing envelopment, the screw is then increasingly only used for securing the textile woven material against the transversal beam 5 falling off.

In a second variant, the transversal beams 5 are enveloped by one or also plural loops 12 which are formed at the faces (with reference to the longitudinal direction) of the cable tray 1 through the textile woven material. Thus, e.g. according to FIG. 4, the protrusions 7 are folded over and are sewn to the faces with the textile woven material in a slightly offset manner. Thus the tension due to the hammock effect can be evenly distributed over the width of the bed 3 and no screws 6 are required to attach the textile woven material at the respective transversal beam 5. By the same token, the textile material can also be secured through a screw against lateral sliding from the transversal beam 5 when a loop is provided. Furthermore, this example illustrates a transversal beam 5 with a circular cross-sectional profile. For other examples, on the other hand side, an oval, triangular, rectangular, pentagonal or hexagonal cross-sectional profile is implemented.

FIG. 5 illustrates a third example which is configured totally without a transversal beam of the cable tray 1. Additionally, the textile woven material is only configured in the portion of the protrusions 7 with holes configured as attachment devices for passing the screws 6 through. Thus, also FIG. 5 illustrates a cable tray which is essentially only made from textile woven material and resin. However, in order to assure circuit integrity under fire impact, also in these examples the hammock effect is used. Thus, it is provided to attach the cable tray 1 that does not include a transversal beam at a respective cable support with screws 9, wherein the cable support is configured with a carrier arm 13. This carrier arm 13 with respect to its function corresponds to the transversal beam 5 as soon as the cable tray 1 is mounted as illustrated in FIG. 5. Thus components and also material can be saved.

Subsequently an installation of the installation kit including cable trays 1, tray supports 9a, b and flat cables 2 is described as illustrated in FIGS. 6 and 7. In this example cable trays 1 according to the example illustrated in FIGS. 1 and 2, are used in the installation. Thus, the subsequent description mostly relates to mechanical aspects, however, the cable trays 1 are provided for electrical circuit integrity of the flat cable 2 under fire impact, so that the circuit integrity of the system, which includes the installation kit, also has to be interpreted from an electrical point of view.

FIG. 6 illustrates two cable trays 1 mounted in an exemplary manner in longitudinal direction behind one another and the flat cable 2 is laid onto the cable trays so that it is supported by the beds 3 of the cable trays 1. Thus, the cable trays 1, with tray supports 9a, 9b, are mounted at a wall so that the cable trays 1 (and also the flat cable 2) extend parallel to the wall.

The tray support 9b differs from the tray supports 9a in that they are configured wider so that they are configured for simultaneous attaching of two attachment devices, thus two transversal beams 5. Herein the two attachment devices are respectively associated with adjacent cable trays 1. Thus, the tray support 9b in this example is used for simultaneous connecting and supporting two cable trays 1. On the other is hand side, the tray supports 9a are only configured for attachment at a single respective attachment device. This configuration is therefore respectively used for the first and the last attachment device of the first or last cable tray 1 of a row.

Therefore, subsequently, only the tray support 9a is described, wherein the following also applies to the tray support 9b. The tray support 9a has a vertical arm 14 for wall mounting and a horizontal arm 15 for supporting the cable tray 1, wherein both arms 14, 15 are made from flat steel which assures circuit integrity based on its dimensions.

The vertical arm 14 is provided with two bore holes 16 to screw the tray support 9a against the wall. At the horizontal arm 15, a vertical plate 18 with a borehole is arranged opposite to the vertical arm 14. In the installation, the cable tray 1 is placed onto the horizontal arm 15 with its attachment device, e.g. with the transversal beam 5, between the vertical arm 14 and the vertical plate 18 and screwed down through the borehole of the vertical plate 18 and another borehole in the vertical arm 14 with screws 17 at the face side threaded boreholes 8. Furthermore, the tray supports 9a are reinforced with a stiffener 19.

Overall, in the installation, the cable trays 1 are respectively only supported at their ends, namely at the transversal beams 5 through which they are mounted on the tray supports 9a, b. Therefore, the cable trays 1 are mounted self-supporting in between, thus without additional mechanical support. In spite of the large span of approximately 2 m per cable tray 1 in the illustrated example, only three tray supports 9a, b are used for two cable trays 1. Thus, the distance of adjacent tray supports 9a, b approximately corresponds to the length of the cable trays 1 besides their width.

Furthermore, the material and the cross-section of the transversal beam 5 and also of the tray support 9, 9a, 9b are selected so that they can safely carry the required tension for the textile woven material or the cable trays 1 over the temperature range up to 1300° C. Furthermore, the tray supports 9, 9a, 9b are resistant against tension in longitudinal direction so that they can apply the tension of the textile woven material without substantially giving way when the weight of the flat cable 2 rests on the textile woven material that has no more resin and is taunted between the transversal beams 5 under fire impact.

Some more general points of examples will be discussed:

The cable trays, for example, are used for installing electrical cables, for example along or also between walls, floors or ceilings of buildings. In the same way, cable trays are used in technical installations and large machines in order to run cables between various system or machine components.

For this purpose, the cable tray includes a bed on which cables can be placed so that they are supported by the cable tray. Conventionally, the bed is made from sheet metal.

In electrical installations with cable trays, the cables and also the cable tray are exposed to fire impact when there is a fire. Thus, the suitability of the electrical installation to provide power under fire impact is generally designated as circuit integrity. The circuit integrity is defined by several standards.

For example, cables are loaded with a voltage according to the standard IEC 60331-11/-21/-23/-25 and are subjected to a temperature greater than 750° C. under flame impact for 90 to 180 minutes. After some time, the strand insulations of the cable lose their insulation capability due to flame impact and there is a short circuit between the cable stands. This means a loss of circuit integrity. Thus the loss of function is caused by the loss of insulation. Accordingly, the circuit integrity of a cable is substantially determined by the insulation integrity of the cable. The behavior under this test is specified by the duration of insulation integrity in minutes. Similar standards are BS 6387 cat. C and VDE 0472-814.

Other standards relate to functional integrity of cables under the impact of fire and water (which for example shall represent the effect of sprinkler systems in case of a fire, thus e.g. DS 6387 cat. W and VdS 3423. Other standards relate to circuit integrity of cables under fire and mechanical impacts which for example shall represent the effect of parts falling onto the cable as it often occurs during a fire, thus EN 50200, EN 50362, and ES 6387 cat. Z.

Besides that there are standards which relate to functional integrity not only of cables, but of entire installation systems. This is designated as "system circuit integrity." For system circuit integrity, support elements like cable attachments, cable suspensions and cable supports, and electrical connection elements like branch off and connection devices are integrated in addition to the cable since they all together provide circuit integrity of an entire installation. A standard relating to system circuit integrity is for example DIN 4102 part 12. In a test according to this standard, the entire installation is exposed to a flame and thus heated over a length of three meters according to a particular increasing standard temperature curve which initially increases in a rather steep manner and then becomes flatter and flatter until it reaches approximately 900° C. after 90 minutes. The behavior under this test is represented by E with a designation of the duration of the circuit integrity in minutes. "E 90" thus means system circuit integrity over 90 minutes.

Usual cables do not comply with such circuit integrity requirements since their insulators quickly melt or burn off under fire impact and a short circuit is then generated when the conductors touch. Therefore, particular equipment is required to prevent a short circuit, for example special insulations.

In order to comply with the rather stringent requirements for system circuit integrity, more is required than just cables with suitable circuit integrity duration. It is rather required that the cable tray also supports circuit integrity under fire impact. The preservation of cable support functionality of a cable tray is therefore a special aspect of "system circuit integrity".

The exemplary cable tray is configured for one or plural cables. Additionally or alternatively it is configured for one or plural cable bundles. For purposes of clarity, however, this description, unless stated differently, is worded to only relate to one cable.

The cable tray facilitates installing the cable in that the cable tray is configured with a bed for laying and supporting the cable. The bed essentially extends over the length of the cable tray so that the cable is supported over an entire tray length. In electrical installations which are described herein, also plural cable trays can be mounted arranged behind one another in longitudinal direction in order to run cables over any greater distances. Furthermore, also "length" and "longitudinal direction" relate herein to the longitudinal direction of the cable in its position where it is laid on the cable tray.

The cable tray is provided with system circuit integrity under fire impact, i.e. it preserves, to a certain extent, cable support functionality under fire impact.

For system circuit integrity, the bed is provided with the fire resistant textile woven material which is embedded in resin. Under fire impact, the resin, however, contributes to the fire load, but this disadvantage is accepted since the composite material including textile woven material and resin has the advantage under fire impact that the textile woven material does not expand to a large extent or even flows under fire impact, unlike sheet metal of conventional cable trays, so that significantly less bending, more precisely hanging through can be obtained under fire impact.

"Fire resistant" means that also under fire impact, e.g. according to the system circuit integrity requirements of respective standards, the textile woven material keeps its load bearing capability for supporting the cable with respect to its mechanical and thermal load bearing capability, even when the resin has burned off completely.

Furthermore, unless stated differently, it is presumed that the resin has completely burned off under fire impact. Furthermore, "normal operations" designates a condition where no fire impact occurs and has not occurred, thus a condition before a fire impact.

Furthermore, unless stated differently herein, the term "bed" relates to normal operations in which the textile material is (still) embedded in resin. However, the cable tray is also provided for the purpose that during or after fire impact the cable is still bedded on the cable tray, providing circuit integrity. In this case (fire impact), the bed, however, is modified so that it is made from the fire resistant textile material without resin, thus resin-free.

During normal operations, the resin on the one hand side protects the textile woven material from external influences, like e.g. mechanical damages or weathering, and on the other hand side also protects the cable from being damaged through the textile woven material. Furthermore, the resin improves the stiffness of the bed, and thus contributes to improved handling of the cable tray and to supporting and guiding the cable in installed condition of the cable tray.

Under fire impact, as recited supra, the resin can burn off completely so that the bed then loses its stiffness that comes from the resin. In order to still support the cable in a reliable manner, the woven textile material is respectively connected with a fire resistant attachment device on both sides with respect to the longitudinal direction of the cable tray. The attachment devices are configured to transfer tension forces of the textile woven material. The tension forces may originate from the weight of the cables and the textile woven material itself. Thus, in a mounted state of the tray, the woven textile material, when the resin has burned off, extends between the attachment devices like a hammock and continues to support the cable.

However, under fire impact, the textile woven material hangs down by a certain distance due to the lacking burned off resin, so that also the cable supported thereon is bent by a certain amount. Thus, however, mechanical tensions can build up in the cable, wherein the mechanical tensions make the strands contact one another when the strand insulation also burns off under fire impact.

Therefore, the textile woven material is attached so that its hanging through under fire impact is kept as small as possible (in the mounted state of the cable tray), the hammock remains quasi-pulled tight. Thus, the installation kit includes at least two tray supports for mounting the at least one cable tray. These tray supports are provided for attachment at the attachment devices. As recited supra, also the woven textile material is connected with the attachment devices. Thus (in a mounted state) the woven textile material is attached at the tray supports through the fire resistant attachment devices, so that it is reliably supported also under fire impact.

Subsequently, different aspects are described with respect to different cable types, wherein this is also relevant with respect to the installation kit described infra.

In some examples a circular fire-safety cable is used. In a circular cable, the strands are twisted with one another. The strand insulation does not completely burn off in a fire-safety cable, for example due to ceramifying additives in the strand insulation material. Therefore under fire impact, the ceramifying additive forms an electrically isolating crust which will prevent the strand conductors placed onto one another at the intersection points to make electrical contact.

In other examples a flat cable is used instead. The strand conductors of the flat cable run without intersection points in the cable. Therefore, a flat cable is better with respect to the risk of a shorting right from the beginning. Furthermore, a flat cable almost has no internal tensions which are typical for twisted circular cables, thus it does not have a pronounced tendency like the circular to distort when the insulation burns off. Thus, a flat cable is particularly suitable for circuit integrity under fire impact.

In some examples the material of the insulation of the strands of the flat cable contains one or more ceramifying additives. Under fire impact, the ceramifying additive forms an electrically isolating crust which will prevent the strand conductors to make electrical contact, should it exceptionally happen that strands of the flat cable contact each other.

However, in other examples the flat cable has no such additives which prevent the insulation from burning off completely. Due to the particular features of a flat cable (no intersection of the parallel strands of the flat cable; no tension which leads to contact between strands) such a flat cable with a completely burning-off insulation can nevertheless be regarded as a "fire safety cable".

Some examples of the installation kit and the installation include a fire safety cable in the form of a flat cable with plural power strands extending in a plane parallel to one another in order to provide suitable circuit integrity under fire impact, with or without an insulation which does not burn off completely.

Furthermore, flat cables are not only being used as data cables, but they are also used for building installations for high voltage conductors. High voltage in the present description means a voltage of at least 100 V (e.g. 120 V/60 Hz in North America, and 230 V/50 Hz in most other countries; voltages respectively relate to a phase relative to ground) for supplying energy to electrical consumers. One high current strand is insulated from the other high current strands of a cable against such voltages and usually configured for currents of at least 6 A. Also hybrid flat cables with high voltage strands and data transmission strands are known (e.g. from EP 0665 608 A2). Hybrid flat cables of this type also have to be considered flat cables.

Apart from the flat cable in some examples of the installation kit and the installation being a fire safety cable, system circuit integrity can be improved, e.g. with a protection against the cable resting on any metal object and this way being shorted by the strand insulation weakened under fire impact. Therefore, in some configurations, the textile woven material is electrically non-conductive. Thus, a shorting through the bed itself (differently from conventional metal cable trays) is prevented. Furthermore, in some examples, the textile woven material forms an electrically insulating support for the cable, wherein the support extends over the length of the cable tray. Thus, an electrically conductive contact between the strand conductors of the cable and other electrically conductive objects or also a short circuit of a strand conductor against a grounded object are prevented. Objects of this type are for example metal components of the cable tray like for example attachment bolts, the tray support, a metal frame on which the cable tray is mounted or other metal objects like tubular conduits which are placed at a short distance below the cable tray, so that these can come into contact when there is no textile woven material placed in between when the cable or the cable tray hangs through under fire impact.

As recited supra, the textile woven material is also used for supporting the cable when the resin has burned off in that the textile woven material acts like a hammock. Thus, the textile woven material is for example respectively clamped on both sides in at least one clamp of the attachment device or attached thereto with at least one engagement hook.

Like the hammocks, also the textile material that is strung between the attachment devices has a tendency to hang through towards the contacting cable (thus transversal to the longitudinal direction), this means to deform more or less like a groove or a hose along the cable or to assume a partially folded configuration. Thus, the strand conductors, however, are exposed to a force transversal to the guide device, thus towards one another so that the risk of a stand conductor contact and thus the risk of shorting increases. Therefore, in some examples, the attachment device includes a transversal beam at which the textile woven material is attached. The transversal beam helps to reduce the recited deformation of the textile woven material in that it remains taunted transversal to the longitudinal direction. Thus the textile band is attached at locations at the transversal beam that are offset from one another in transversal direction, for example with bolts or hooks.

In some examples, the textile woven material is at least partially wound about the transversal beam so that the increased friction between textile woven material and transversal beam helps to unload the attachment between the transversal beam and the woven textile material under a tension load. In some of these examples, the textile woven material is wound about at least half, three quarters, or the entire circumference of the transversal beam. In some examples, the textile woven material is wound about the transversal beam at least 1.5, 2, 3, 4 or 5 times. With increasing envelopment of the transversal beam, for example a screw for supporting the textile woven material is increasingly unloaded and is then increasingly used for solely securing the textile woven material against fall-off. In some examples, the transversal beam is at least partially embedded in the resin together with the textile band.

In some examples, the transversal beam is made from a metal material, in other examples it is made from an electrically non-conductive, e.g. insulating material, wherein the transversal beam is respectively configured with thick walls or solid in order to achieve the circuit integrity duration. Furthermore, the transversal beam is for example configured cylindrical, thus as a circular or rectangular rod or alternatively also as a circular or rectangular tube.

In some examples, the length of the transversal beam essentially corresponds to the width of the bed so that the bed is supported by the transversal beam over its entire width. In some examples, the transversal beam is longer than the width of the bed so that it protrudes laterally beyond the bed at least on one side. At this location, thus at the at least one protrusion of the transversal beam beyond the bed, in some examples, the cable tray itself is mounted e.g. in that the tray supports for mounting the cable tray are attached at a ceiling, a base and/or at a wall at the overhang or the overhangs.

For fire proof connecting of the textile woven material with the attachment device, e.g. with the transversal beam, the textile woven material in some examples is configured on both sides with respect to the longitudinal direction with a textile loop. In some configurations, the loop is formed in that the faces of the textile woven material with respect to the longitudinal direction are overall folded over and thus form a loop which extends over the width of the textile woven material. Thus, the folded over portion of the textile woven material can for example be sewn together with the remaining portion which is used for supporting the cables. Alternatively, a face side loop can also be produced through a suitable weaving process when producing the textile woven material.

Instead of the loop, at least two holes are arranged respectively on both sides in the textile material as alternative configurations (with respect to the longitudinal direction), wherein the holes are offset transversal to the longitudinal direction. Thus, the textile woven material can be engaged e.g. at suitable protrusions or hooks of the attachment device. Alternatively, the textile band can be bolted for example to the transversal beam in that the screws are run through the holes of the textile band. Furthermore, the holes are configured reinforced in some examples. For example, they are reinforced with a seam along the edge of the holes in order to prevent the holes from tearing out under load. Furthermore, the hose shaped deformation can be reduced through the at least two holes that are offset in transversal direction, wherein the holes are used for attaching at plural offset locations in that the textile band is attached in transversal direction at least at two offset locations which counteracts a folding of the textile band.

With respect to the support of cables, in some cases a flat, essentially planar shape of the bed, e.g. a plate, suffices. A bed of this type, however, may not provide any support for cables in lateral direction. Therefore, in some examples, the bed essentially has a U-shaped cross-sectional profile for inserting and laterally guiding cables. Furthermore, the U-shaped cross-sectional profile has significantly greater bending stiffness which is also improves handling the tray before or during assembly, thus before the tray is attached at or on the tray supports.

The cable tray with the bed made from textile woven material in case of a fire does not show the same bending as conventional sheet metal trays, thus it does not start to bend ever more quickly with increasing temperatures or to even flow. For the cable tray with textile woven material, the bending, more precisely hanging through, after burn off of the resin is essentially defined by the load due to the supported cable and the elasticity of the textile woven material.

Therefore, in some examples, the textile woven material is essentially non-elastic, thus only yields by an insignificant amount under tension. This can be implemented through the tissue structure and/or material, properties and length of the tissue fibers.

In some examples, the fire resistant textile woven material is a glass fiber material, e.g. a silica woven material or a carbon fiber woven material. In some examples, the resin is a polyester resin, an epoxy resin or a phenolic resin. In some examples, the cable tray is configured for circuit integrity up to a temperature up to 700° C., 900° C., 1100° C. and 1300° C. Thus, however, it is taken into consideration that the resin already burns off at lower temperatures in some examples.

In spite of better properties with respect to bending, which the bed configured with textile woven material demonstrates over conventional sheet metal trays in case of fire, the bed still yields slightly when the resin burns off. In order to additionally reduce the hang through of the cable tray in case of a fire, in some examples the bed is configured with at least one support rod. Support rods can be arranged along the longitudinal direction, the transversal direction, and/or diagonal relative to the bed in order to reduce hang through along the longitudinal and/or transversal direction. Thus in some examples, at least two support rods are arranged in different directions. The at least one support rod is for example embedded in the resin together with the textile woven material. In some examples, the at least one support rod is braided into the woven textile material or woven in and run through plural loops or slots of the textile woven material.

Additional aspects relate to the electrical installation with circuit integrity under fire impact in which at least one cable tray that is described herein is installed and, in some examples, a flat cable is placed onto the cable tray. Thus, the cable tray is mounted in that its attachment devices are respectively attached at a tray support.

In some examples, exactly one tray support is provided per attachment device of the cable tray. In other examples in which at least two cable trays are arranged in series along the orientation of the conductor, adjacent attachment devices of adjacent cable trays are respectively jointly mounted at a tray support. In this case, for example, n cable trays (n is the number of cable trays in this example) are mounted using n+1 tray supports.

Since the cable tray, in particular the textile woven material, extends like a hammock, in some examples, the tray supports are configured pull resistant and also attached pull resistant, for example at a wall, a ceiling or a floor. "Pull resistant" means that two adjacent tray supports are configured or mounted so that a particular tension can build up between them and so that they do not significantly move towards one another. Thus, the textile woven material can be installed with sufficient tension for small unsubstantial hang through under fire impact between adjacent trays through the attachment devices like a hammock and the textile woven material can also be kept under tension when the resin burns off.

The only insignificant hang through (in particular under fire impact) of the bed facilitates that in some examples the cable tray is only mounted with tray supports which are attached at the attachment devices. Thus, the cable tray is self-supporting between two tray supports. Furthermore, the attachment devices as described supra are respectively arranged at ends of the cable tray in longitudinal direction, so that the cable tray is only supported by tray supports at two distal locations.

Furthermore, in some examples, the tray supports are arranged in longitudinal direction at substantially larger intervals than for conventional cable trays with circuit integrity, thus at a distance of 1 m, 1.2 m, 1.5 m, 1.8 m, 2 m or at an even greater distance. The cable tray itself in some examples is e.g. 1 m, 1.2 m, 1.5 m, 1.8 m, and 2 m long or longer. The width of the bed in some examples is 10 cm, 20 cm, 30 cm, 40 cm, 50 cm, 60 cm or more. Some examples have at least a bar or a bead made from textile woven material embedded in the resin, wherein the bead extends in the bed in longitudinal direction. Thus, adjacent cables can be kept at a distance in order to prevent the strand conductors from contacting one another under fire impact.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

All publications and existing systems mentioned in this specification are herein incorporated by reference.

What is claimed is:

1. A cable tray preserving cable support functionality under fire impact,
   wherein the cable tray comprises a bed for laying at least one cable in a longitudinal direction and supporting the at least one cable, which bed extends over a length of the cable tray in the longitudinal direction,
   wherein the bed has a U-shaped cross-section when viewed in the longitudinal direction, the U-shaped bed forming a channel with side-walls extending in the longitudinal direction and with open longitudinal ends to enable at least one cable to extend over plural cable trays arranged behind one another in the longitudinal direction,
   wherein the bed is made from electrically non-conductive and fire resistant textile woven material which is embedded in resin and the textile woven material is provided on both longitudinal ends of the cable tray with a fire resistant attachment device,
   wherein the attachment devices are coupled to the textile woven material, wherein, with burned-off resin, the attachment devices remain coupled to the textile woven material to take up tension force from the textile woven material when the textile woven material extends between the attachment devices to still support the at least one cable,
   wherein the attachment devices comprise a beam at which the textile woven material is attached, the beam extending transverse to the longitudinal direction at least over the entire width of the bed below the U-shaped cross-section of the bed.

2. The cable tray according to claim 1,
   wherein the textile woven material is electrically non-conductive, and
   wherein the textile woven material is configured to form an electrically insulating support for the cable which support extends over the entire length of the cable tray when the resin and the cable insulation have burned off under fire impact.

3. The cable tray according to claim 1, wherein the transversal beam of the attachment device is a metal beam.

4. The cable tray according to claim 1, wherein the textile woven material is configured on both longitudinal ends of the cable tray with a textile loop, and wherein the transversal beams are enveloped by one or plural loops.

5. The cable tray according to claim 1,
wherein at least two holes are arranged in the textile woven material on both ends of the cable tray the longitudinal direction, and
wherein the holes are offset from one another transversal to the longitudinal direction.

6. The cable tray according to claim 1,
wherein the bed's U-shaped cross-section has two arms forming the side walls of the bed, and a portion connecting the two arms of the U-shape,
wherein the textile woven material extends over both arms of the U-shaped cross-section and over the portion connecting the two arms of the U-shaped cross-section, and
wherein the U-shaped cross-section is open to an upper side, and wherein the transverse beam of the attachment device extends at least over the entire width of portion connecting the two arms of the U-shaped cross-section at a lower side of the U-shaped cross-section which is opposite to the upper side.

7. The cable tray according to claim 1, wherein the textile woven material is essentially a glass fiber woven material.

8. The cable tray according to claim 1, wherein the resin is one of polyester resin, epoxy resin and phenolic resin.

9. The cable tray according to claim 1, wherein the cable tray has a cable support function, and wherein the cable tray preserves the cable support function up to a temperature of 1300° C.

10. An installation kit for an electrical installation, comprising:
at least one cable tray for preserving cable support functionality under fire impact,
at least one fire safety cable with circuit integrity under fire impact; and
at least two tray supports for mounting the at least one cable tray,
wherein the cable tray comprises a bed for laying at least one cable in a longitudinal direction and supporting the at least one cable, which bed extends over a length of the cable tray the longitudinal direction,
wherein the bed has a U-shaped cross-section when viewed in the longitudinal direction, the U-shaped bed forming a channel with side-walls extending in the longitudinal direction and with open longitudinal ends to enable at least one cable to extend over plural cable trays arranged behind one another in the longitudinal direction;
wherein the bed is made from electrically non-conductive and fire resistant textile woven material which is embedded in resin and the textile woven material is provided on both longitudinal ends of the cable tray with a fire resistant attachment device,
wherein the attachment devices are coupled to the textile woven material, wherein, with burned-off resin, the attachment devices remain coupled to the textile woven material to take up tension force from the textile woven material when the textile woven material extends between the attachment devices to still support the at least one cable,
wherein the tray supports are configured for attachment at the attachment devices,
wherein the attachment device comprises a beam at which the textile woven material is attached, the beam extending transverse to the longitudinal direction at least over the entire width of the bed below the U-shaped cross-section of the bed.

11. The installation kit of claim 10, wherein the fire safety cable is a flat cable with plural power strands extending parallel to one another and adjacent to one another in a plane.

12. An electrical installation with circuit integrity under fire impact, comprising:
at least one cable tray preserving cable support functionality under fire impact,
at least one cable in the cable tray; and
at least two tray supports;
wherein the at least one cable tray comprises a bed for laying the at least one cable, which bed extends in a longitudinal direction over a length of the cable tray,
wherein the bed is made from electrically non-conductive and fire resistant textile woven material which is embedded in resin and the textile woven material is provided on both ends of the cable tray in longitudinal direction of the cable tray with a fire resistant attachment device,
wherein the bed forms a channel in which the at least one cable is inserted,
wherein the attachment devices are coupled to the textile woven material, wherein, with burned-off resin, the attachment devices remain coupled to the textile woven material to take up tension force from the textile woven material when the textile woven material extends between the attachment devices to still support the at least one cable;
wherein the at least one cable tray is attached with the attachment devices at tray supports.

13. The electrical installation of claim 12, wherein the cable is a fire safety cable.

14. The electrical installation of claim 13, wherein the fire safety cable is a flat cable with plural power strands extending parallel to one another and adjacent to one another in a plane.

15. The electrical installation according to claim 12, comprising a plurality of cable trays which are mounted by tray supports,
wherein adjacent cable trays are mounted with a common tray support.

16. The electrical installation according to claim 12, wherein the cable tray is only mounted by tray supports which are attached at the attachment devices, so that the cable tray is self-supporting there between.

17. The cable tray according to claim 4, wherein the textile woven material is wound around the transversal beams.

18. The cable tray according to claim 1, wherein the attachment devices are only provided at the longitudinal ends of the cable tray.

19. The electrical installation according to claim 12,
wherein the bed has a U-shaped cross-section when viewed in the longitudinal direction, the U-shaped bed forming the channel forming in which the at least one cable is inserted, the channel having side-walls extending in the longitudinal direction and open longitudinal ends to enable at least one cable to extend over plural cable trays arranged behind one another in the longitudinal direction
wherein the bed has a U-shaped cross-section forming the channel in which the at least one cable is inserted,
wherein the attachment device comprises a beam at which the textile woven material is attached, the beam extending transverse to the longitudinal direction at least over the entire width of the bed below the U-shaped cross-section of the bed.

20. The electrical installation according to claim 12 wherein the bed's U-shaped cross-section has two arms forming the sidewalls of the bed, and a portion connecting the two arms of the U-shape, wherein the textile woven material extends over both arms of the U-shaped cross-section and over the portion connecting the two arms of the U-shaped cross-section, and wherein the U-shaped cross-section is open to an upper side, thereby forming the bed with the inserted cable, and wherein the transverse beam of the attachment device extends at least over the entire width of portion connecting the two arms of the U-shaped cross-section at a lower side of the U-shaped cross-section which is opposite to the upper side.

21. The electrical installation according to claim 12, wherein the attachment devices are only arranged at the longitudinal ends of the cable tray.

\* \* \* \* \*